United States Patent

Economy et al.

[15] 3,650,102
[45] Mar. 21, 1972

[54] FIBERS FROM NOVOLACS

[72] Inventors: James Economy, Eggertsville, N.Y.;
Rodger A. Clark, Indianapolis, Ind.

[73] Assignee: The Carborundum Company, Niagara Falls, N.Y.

[22] Filed: Mar. 4, 1968

[21] Appl. No.: 710,292

[52] U.S. Cl. ............................57/140 R, 161/70, 161/172, 260/57 A, 260/59, 264/176 F
[51] Int. Cl. .........................................C08g 5/06, D01f 7/00
[58] Field of Search....................161/172, 70; 260/57 A, 59; 264/176, 178; 57/140 R

[56] References Cited

UNITED STATES PATENTS 2,535,373  12/1950  Shearer et al. ..........................264/126

FOREIGN PATENTS OR APPLICATIONS 860,045  1/1941  France.....................................260/59

OTHER PUBLICATIONS

Herbert A. Pohl, " Reaction Spinning of Fibers" Textile Research Journal June, 1958 pp. 473– 477

*Primary Examiner*—Robert F. Burnett
*Assistant Examiner*—Raymond O. Linker, Jr.
*Attorney*—K. W. Brownell

[57] ABSTRACT

A novolac melt is fiberized to produce a thermoplastic, uncured novolac fiber, and the novolac is cured by heating the fiber in a formaldehyde environment in the presence of an acid catalyst to obtain an infusible, cured novolac fiber.

12 Claims, 1 Drawing Figure

PATENTED MAR 21 1972 3,650,102
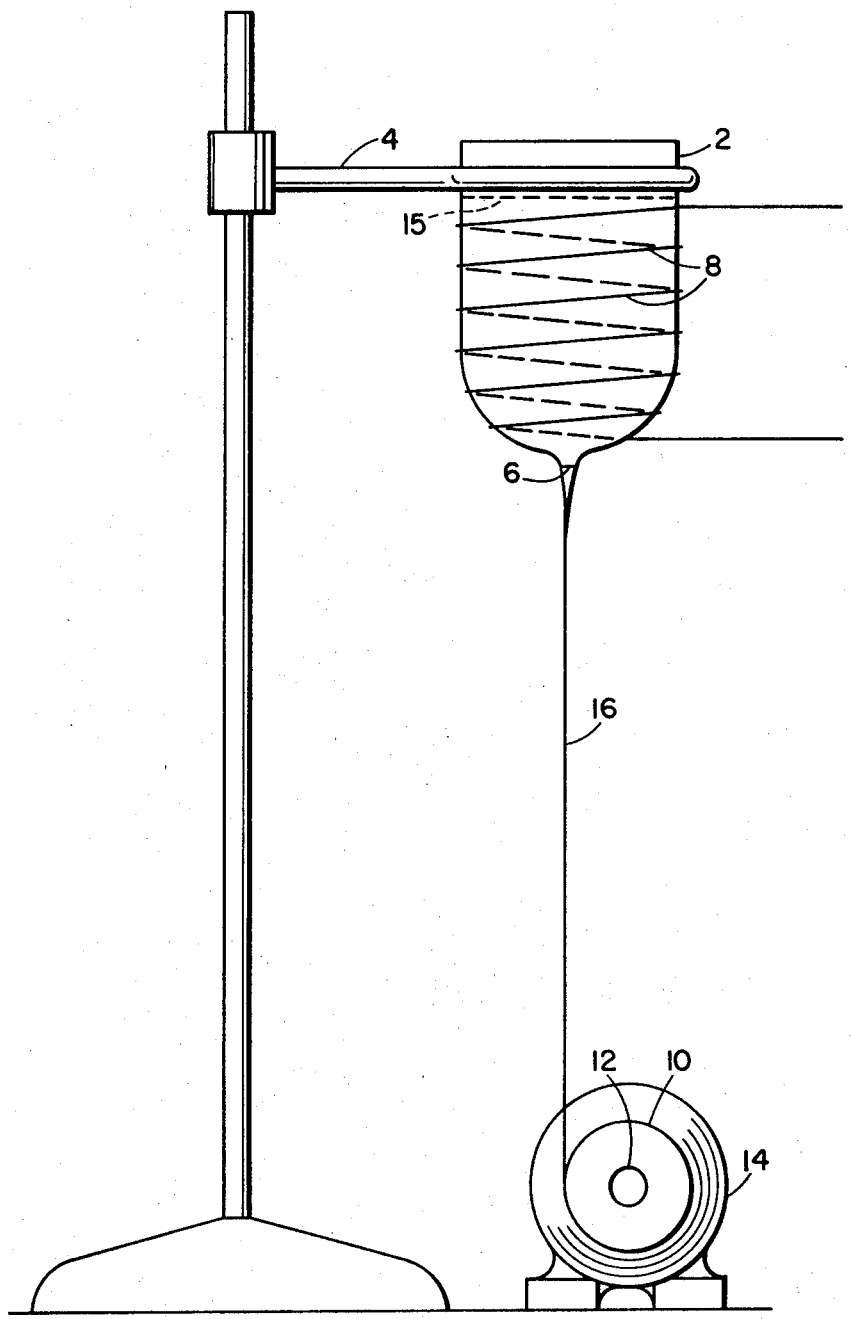
INVENTORS
JAMES ECONOMY
RODGER A. CLARK
BY
K.W. Brownell

FIBERS FROM NOVOLACS

The present invention relates to fibers from novolacs and to a method for their production.

In accordance with the method of the invention, a novolac is melted and formed into a fiber by any convenient fiberizing means to produce a thermoplastic, uncured novolac fiber. The novolac is then rendered infusible by heating the fiber in a formaldehyde environment in the presence of an acid catalyst at a temperature and for a time sufficient to effect curing, i.e., advancement of the molecular weight of the novolac to obtain an infusible, cured novolac fiber.

Cured novolac fibers according to the invention have various highly desirable properties which will be elaborated upon hereinafter, these properties rendering the fibers, in suitable forms, useful in a wide variety of practical applications.

The drawing schematically illustrates apparatus which is useful in fiberizing a novolac in carrying out the method of the invention.

The first step in carrying out the method of the invention is to fiberize the novolac selected as the starting material. This is conveniently accomplished with the use of apparatus such as that illustrated in the drawing, which comprises a vessel 2 made of any suitable material such as stainless steel mounted on any suitable support 4. The vessel 2 has an orifice 6 at its bottom, and its exterior is surrounded by electric wire heating coils 8 connected to an adjustable source of electricity (not shown) whereby a controlled amount of heat may be imparted to the vessel and its contents. The apparatus further comprises a spool 10 attached to the shaft 12 of a variable speed electric motor 14 mounted beneath the vessel 2.

In operating the apparatus, the novolac selected as the starting material is placed in the vessel 2 and heat is applied to the vessel by means of the heating coils 8 to melt the novolac and maintain the melt 15 at the desired temperature. The melt flows out of the orifice 6 and is attenuated into a fiber 16 as a result of being drawn downward by revolution of the spool 10 to which the fiber is attached. The fiber, which solidifies upon contacting the atmosphere and cooling, is wound up on the spool. The drawing rate may be regulated by the speed at which the spool 10 is driven by the variable speed motor 14.

EXAMPLE 1

To 4,880 g. of a mixture consisting of 77% phenol, 8.7% formaldehyde and 14.3% water is added 8 g. of 95% sulfuric acid. The mixture is heated to 70° C. whereupon a novolac-producing reaction begins to occur. Over a 15 minute period, 1,640 g. of an aqueous 37% formaldehyde solution is added, and the mixture is allowed to reflux for 3 hours. A solution of 7 g. of sodium hydroxide in 50 ml. of water is added to neutralize the sulfuric acid. The mixture is then vacuum distilled, to remove the water present, at a temperature gradually increasing to a final temperature of 150° C., and the novolac which remains is allowed to cool to about 100° C.

The novolac is stirred vigorously with 2 l. of water and the mixture is allowed to settle, the water then being decanted and discarded, this water wash serving to reduce free phenol, sodium sulfate, and low molecular weight novolac fractions. The water wash is repeated twice and the novolac is allowed to cool to room temperature, solidifying. The novolac has a $\overline{M}n$ (number-average molecular weight) of about 850 and a viscosity at 130° C. of about 68,800 c.p.s.

EXAMPLE 2

Apparatus is assembled as shown in the drawing, employing a vessel having an orifice with an inner diameter of 1.9 mm. A 100 g. portion of a novolac prepared as in Example 1 is placed in the vessel and heated t135° C., and the resulting melt is drawn into a fiber at a rate of about 3,000 feet (915 meters) per minute. The drawn fiber is wound up on the spool, which is made of a suitable material such as graphite or polypropylene which is not affected by the reagents subsequently to be employed in curing the novolac.

The resulting uncured novolac fiber has a slightly elliptical cross section and an average diameter of about 12 microns. The fiber is thermoplastic, but weak and brittle, and has a glassy or amorphous structure. Birefringence suggests that the molecules in the fiber tend to be oriented in the direction of the axis of the fiber.

The fiber-containing spool is immersed at room temperature in a mixture of 500 ml. of 36% hydrochloric acid and 500 ml. of an aqueous 37% formaldehyde solution; i.e., an aqueous solution containing 18% HCl and 18.5% formaldehyde. The temperature of the solution is brought to 40° C., then increased gradually from 40° to 60° C. over a period of 3 hours, and finally increased from 60° to 100° C. over a period of 1 hour. It is to be noted that no fusion of the fiber occurred. The fiber is removed, washed with water, and dried in air at about 100° C.

The properties of randomly selected samples of the resulting infusible, cured novolac fiber are determined, with the following results. Tensile strength ranges from about 15,000 to about 30,000 p.s.i. (2,050 to 2,100 kg./sq. cm.), averaging 22,000 p.s.i. (1,540 kg./sq. cm.). Elastic modulus ranges from $0.48 \times 10^6$ to $1.04 \times 10^6$ p.s.i. ($0.034 \times 10^6$ to $0.073 \times 10^6$ kg./sq. cm.), averaging $0.76 \times 10^6$ p.s.i. ($0.053 \times 10^6$ kg./sq.cm.). Break elongation ranges from 3.2 to 5.4%, averaging 4.0%. Fracture energy ranges from 0.020 to 0.058 inch gm./$100\mu^2$ (0.051 to 0.147 cm. gm./$100\mu^2$), averaging 0.036 inch gm./$100\mu^2$ (0.091 cm. gm./$100\mu^2$).

EXAMPLE 3

The cured novolac fiber prepared in Example 2 is further cured by heating it for 6 hours at 150° C. in a nitrogen atmosphere. After cooling, the properties of various portions of the cured novolac fiber are measured, with the following results. Tensile strength ranges from 20,000 to 34,000 p.s.i. (1,400 to 2,400 kg./sq. cm.), averaging 26,000 p.s.i. (1,800 kg./sq. cm.). Elastic modulus ranges from $0.63 \times 10^6$ to $1.06 \times 10^6$ p.s.i. ($0.044 \times 10^6$ to $0.074 \times 10^6$ kg./sq. cm.), averaging $0.8 \times 10^6$ p.s.i. ($0.056 \times 10^6$ kg./sq. cm.). Break elongation ranges from 7.1 to 19.1%, averaging 11.6%. Fracture energy ranges from 0.079 to 0.315 inch gm./$100\mu^2$ (0.20 to 0.80 cm. gm./ $100\mu^2$), averaging 0.184 inch gm./$100\mu^2$ (0.47 cm. gm./$100\mu^2$.

It may be noted that a slight increase in tensile strength and a marked increase in break elongation and fracture energy is effected by the further curing.

EXAMPLE 4

Apparatus is assembled as shown in the drawing, employing a vessel having an orifice with an inner diameter of 1.9 mm. A 30 g. quantity of a phenol formaldehyde novolac similar to that prepared in Example 1 but having a $\overline{M}n$ of 690 and a viscosity of 13,600 c.p.s. at 130° C. is placed in the vessel. The novolac is heated to 105° C., and the resulting melt is drawn into a fiber at a rate of about 600 feet (185 meters) per minute, the fiber being wound up on the spool. The fiber has a diameter of about 15 microns.

The fiber is removed from the spool and suspended in a vertical glass tube 12 inches (30 cm.) long having an inner diameter of 2 inches (5 cm.). The tube may be heated from an external source and is adapted to permit the flow of a gas therethrough. A gaseous mixture of hydrogen chloride and formaldehyde is passed upwardly through the tube at a rate of about 50 ml. of each per minute. As the gas flow is continued, the temperature as measured by thermocouples in the tube, is increased from 25° to 50° C. over a period of 1.5 hour, then from 50° to 65° C. over a period of 1.5 hour, and finally from 65° to 105° C. over a period of 1 hour.

The resulting infusible, cured novolac fibers have an average tensile strength of 20,000 p.s.i. (1,400 kg./sq. cm.), an average break elongation of 3.7%, and an average elastic modulus of $0.70 \times 10^6$ p.s.i. ($0.049 \times 10^6$ kg./sq. cm.).

After further curing the fibers by heating them at 150° C. for 6 hours in a vacuum (about 15 mm. of Hg), they have an average tensile strength of 25,500 p.s.i. (1,780 kg./sq. cm.), an average break elongation of 10.5%, and an average elastic modulus of $0.75 \times 10^6$ p.s.i. ($0.052 \times 10^6$ kg./sq.cm.).

EXAMPLE 5

Apparatus is assembled as shown in the drawing, employing a vessel having an orifice with an inner diameter of 1.9 mm. A 30 g. quantity of a m-cresol formaldehyde novolac having a $\overline{M}n$ of 970 and a viscosity of about 35,000 c.p.s. at 165° C. is placed in the vessel. The novolac is heated to 165° C. and the resulting melt is drawn into a fiber at a rate of 600 feet (185 meters) per minute, the resulting fiber having a diameter of 20 microns.

The fiber is cut from the spool and cured to produce an infusible fiber, employing a vertical tube and gaseous hydrogen chloride and formaldehyde as described in Example 4. The temperature during the curing cycle is raised from 25° to 130° C. over a period of 20 minutes. For further cure, the temperature is further increased from 130° to 190° C. over a period of 30 minutes while maintaining the flow of hydrogen chloride and formaldehyde.

Measurements on the resulting cured novolac fibers show that they have an average tensile strength of 20,000 p.s.i. (1,400 kg./sq. cm.), an average break elongation of 8%, and a average elastic modulus of $0.7 \times 10^6$ p.s.i. ($0.049 \times 10^6$ kg./sq. cm.).

EXAMPLE 6

100 g. of a diphenyl oxide modified phenol formaldehyde novolac available from The Dow Chemical Company under the designation ET-823-1200 is fiberized using apparatus as shown in the drawing employing a vessel with an orifice having an inner diameter of 1.9 mm. The novolac has a diphenyl oxide to phenol mole ratio of 1:1, a $\overline{M}n$ of 1,200, and a viscosity of 40,000 c.p.s. at 110° C. Fiberization is carried out at 110° C. at a rate of 600 feet (185 meters) per minute to produce a fiber having a diameter of 14 microns, the fiber being wound up on the spool.

The fiber, on the spool, is immersed at room temperature in an aqueous solution containing 18% HCl and 18.5% formaldehyde for 16 hours. The temperature is then increased over a period of 6 hours from room temperature of 100° C., where it is held for 2 hours. The infusible fiber is removed, washed with water, and dried in air at 100° C., then further cured by heating at 150° C. for 6 hours in a nitrogen atmosphere. The resulting cured novolac fiber has an average tensile strength of 27,000 p.s.i. (1,890 kg./sq. cm.), an average break elongation of 11.5%, and an average elastic modulus of $0.65 \times 10^6$ p.s.i. ($0.045 \times 10^6$ kg./sq. cm.).

EXAMPLE 7

A mixture of 540 g. of m-cresol, 540 g. of p-cresol, 730 g. of an aqueous 37% formaldehyde solution and 2.16 g. of oxalic acid is heated at refluxing temperature for 1.5 hour to produce a m,p-cresol formaldehyde novolac. The reaction mixture is neutralized with 2N NaOH. The excess formaldehyde, unreacted cresols, and water are removed by distillation at atmospheric pressure and then distillation in vacuum (about 15 mm. of Hg) up to a final temperature of 160° C. The resulting novolac has an $\overline{M}n$ of 720 and a viscosity of about 30,000 c.p.s. at 130° C.

The novolac is fiberized as described in Example 2 at a temperature of 130° C. and a rate of 600 feet (185 meters) per minute to produce a fiber having a diameter of 25 microns. The fiber is cured as in example 6 to produce an infusible, cured novolac fiber.

EXAMPLE 8

50 g. of phenol formaldehyde novolac prepared as in Example 1 and 50 g. of p-phenyl phenol novolac available from Archer-Daniels-Midland Company under the trade name Syncoat 618 are melted and mixed together at about 130° C., at which temperature the mixture has a viscosity of 35,000 c.p.s. The melt is fiberized as in Example 2 at a temperature of 130° C. and a rate of about 600 feet (185 meters) per minute to produce a fiber having a diameter of 15 microns.

The fiber is cured as in Example 6 to produce an infusible, cured novolac fiber.

As may be seen from the examples, fibers may be prepared according to the invention from any of a wide variety of novolacs. The term novolac refers to a condensation product of a phenolic compound with formaldehyde, the condensation being carried out in the presence of an acid catalyst to form a novolac resin, wherein there are virtually no methylol groups such as are present in resoles and wherein the molecules of the phenolic compound are linked together via methylene groups. The phenolic compound may be phenol, or phenol wherein one or more of the non-hydroxylic hydrogens are replaced by any of various substituents attached to the benzene ring, a few examples of which are the cresols, phenylphenols, 3,5-dialkylphenols, chlorophenols, resorcinol, hydroquinone, phloroglucinol, and the like. The phenolic compound may instead be a naphthol or a hydroxyphenanthrene or another hydroxyl derivative of a compound having a condensed ring system.

For purposes of the present invention, any fusible novolac which is capable of further polymerization with a suitable aldehyde may be employed for the production of fibers. Stated another way, the novolac molecules must have two or more available sites for further polymerization. Apart from this limitation any novolac may be employed, including modified novolacs, i.e., those in which a non-phenolic compound is also included in the molecule, such as the diphenyl oxide modified phenol formaldehyde novolac used in Example 6. Mixtures of novolacs may be employed, as in Example 8. Novolacs containing more than one species of phenolic compound may be employed, such as the meta and para-cresol novolac in Example 7.

Novolacs generally have a number-average molecular weight in the range from about 500 to about 1,200, although in exceptional cases a molecular weight as low as 300 or as high as 2,000 or more may occur. Unmodified phenol formaldehyde novolacs usually have a number-average molecular weight in the range from about 500 to about 900, most of the commercially available materials falling within this range.

Novolacs of any molecular weight may be employed in carrying out the method of the invention. However, there are generally certain disadvantages to employing a novolac having a molecular weight at the extreme upper or lower end of the molecular weight range for the type of novolac under consideration. When a very high molecular weight novolac is used, it is usually necessary to resort to a somewhat higher fiberizing temperature than would otherwise be necessary, in order to achieve a melt viscosity which is sufficiently low to permit fiberization. It is frequently found that, at this higher temperature, there is a tendency of the novolac to gel, thus interfering with proper fiberization. On the other hand, when a very low molecular weight novolac is used, the temperature at which such novolac softens and becomes tacky is usually comparatively low, and it is therefore necessary to cure the fiberized novolac at a very low temperature to avoid adherence and/or deformation of the fibers. It is usually undesirable to employ such low curing temperatures since, as will be seen, the curing rate increases dramatically with increasing temperature, and low temperature curing entails the practical disadvantage of a prolonged curing cycle. Balancing the foregoing factors, it is generally preferred to employ a novolac having a moderately high molecular weight for the type of novolac under consideration to permit curing in a reasonable time without adherence and/or deformation, but to avoid the extreme upper end of the molecular weight range to minimize problems in fiberizing due to gelling.

Of the many types of novolacs which are known, it is usually preferred to use a phenol formaldehyde novolac such as employed in Examples 2 and 4, since they are usually the least expensive.

When employing fiberizing apparatus such as that shown in the drawing for melt spinning the selected novolac, fibers may be produced having a rather uniform diameter. A wide range of diameters may be produced, fibers having been made with a diameter less than 4 microns and greater than 100 microns. The fiber diameter depends primarily upon two factors, the drawing rate and the flow rate of the melt through the orifice. The fiber diameter decreases as the drawing rate is increased, and increases as the flow rate of the melt is increased. The flow rate of the melt depends primarily upon the diameter and length of the orifice and the viscosity of the melt, increasing as the orifice diameter is increased, decreasing as the length of the orifice is increased, and increasing as the viscosity of the melt is decreased. An increase in flow rate may also be effected, if desired, by applying pressure to the melt whereby to force it through the orifice. The orifice must be far enough above the spool to give the newly formed fiber ample time to cool and solidify.

When the various factors involved are properly taken into account, satisfactory fibers may generally be drawn from a novolac melt having a viscosity of from about 5,000 to about 70,000 cps, although it is generally preferred to operate in the range from about 20,000 to about 50,000 c.p.s. Accordingly, the temperature of the novolac melt should be such as to result in such a viscosity with the particular novolac being used. As noted above, when the novolac has an extremely high molecular weight for the particular type of novolac being employed, an excessively high temperature may be required to obtain a suitable fiberizing viscosity and some gelling may therefore tend to occur. Thus, it is usually preferred to avoid the use of such high molecular weight novolacs.

Other conventional modifications and methods may be employed in fiberizing the novolac. For example, the melted novolac may be extruded under pressure while being drawn and, if desired, the novolac melt may first be forced through a filter under pressure to remove any solid impurities and thereby improve the quality of the fibers. Instead of drawing, a blowing method may be used whereby a novolac melt is allowed to drop in a thin stream into the path of a blast of air which fiberizes the stream. The blowing method produces staple fibers which vary considerably in length and diameter.

The uncured novolac fibers of the invention are thermoplastic, but generally rather weak and brittle, and are usually colorless or light amber. Birefringence indicates that there is some tendency for the novolac molecules to orient in the direction of the axis of the fiber. As already noted, fibers have been made with diameters of less than 4 microns up to more than 100 microns. By the blowing method, fibers with diameters as low as about 0.1 micron may be prepared, and fibers as large as about 300 microns in diameter may be drawn.

Curing of the novolac to render the fiber infusible is effected by heating the uncured novolac fiber in a liquid or gaseous formaldehyde environment in the presence of an acid catalyst. It appears that the curing mechanism involves the diffusion of the formaldehyde into the fiber and reaction of the novolac and formaldehyde to bring about polymerization of the novolac molecules.

One means of effecting the presence of the acid catalyst during the curing is to incorporate a small amount of a suitable acid such as sulfuric, phosphoric or oxalic acid in the novolac melt prior to fiberization, thereby obtaining uncured novolac fibers containing a catalytic quantity of the acid. The fibers may then be heated in a liquid or gaseous formaldehyde-containing environment. There are, however, two disadvantages to following this procedure. First, the presence of the acid in the novolac melt may increase the tendency toward gel formation in the melt. Secondly, prolonged washing of the cured novolac fibers is often required to remove the acid.

Accordingly, it is preferred to effect curing by heating the uncured novolac fibers in an environment containing both the formaldehyde and the acid. The environment may be gaseous, as in Examples 4 and 5, but is preferably liquid as in Examples 2 and 6, i.e., a solution of the acid and formaldehyde. Liquid is preferred because of the greater rapidity of heat and material transport to the fibers, especially the fibers in the interior portions of a bundle of fibers being cured, and also because higher concentrations of formaldehyde and acid may be achieved by employing a solution thereof.

When a solution is employed for the curing step, any of a wide variety of acids may be used as the catalyst, including mineral acids such as hydrochloric, sulfuric and phosphoric acids, and organic acids such as oxalic acid. Hydrochloric acid has been found to be eminently suitable. Water is the solvent of choice, although other liquids may be employed, provided that they do not adversely affect the fiber and are capable of dissolving the formaldehyde and acid. It is preferred that the solution contain from about 12% to about 18% each of the acid and formaldehyde. As little as 1% of each will suffice, but a somewhat longer curing cycle is then usually required. More than 18% of either or both may be used but does not appear to offer any advantage.

When curing is carried out in a gaseous environment, any gaseous acid such as hydrogen bromide or hydrogen chloride may be employed, the latter being particularly suitable. The formaldehyde may conveniently be generated by heating paraformaldehyde. The gaseous atmosphere may contain as little as about 10% formaldehyde up to as much as 99%, by volume, and from about 1% to about 90% by volume of the acid. If desired, the atmosphere may also contain a diluent such as nitrogen or other inert gas, but air should be excluded to minimize the possibility of side reactions taking place.

In either a gaseous or liquid environment, the rate of curing increases dramatically with increasing temperature. Table I shows the approximate curing time necessary at various temperatures for phenol formaldehyde novolac fibers.

TABLE I

| Temperature (°C.) | Approximate Curing Time (minutes) |
| --- | --- |
| 25 | >18000 |
| 50 | 4200 |
| 75 | 600 |
| 100 | 100 |
| 125 | 30 |
| 150 | 15 |
| 175 | 6 |
| 200 | 3 |

It may be noted that it is possible to cure the novolac fibers at room temperature (25° C.) but it is highly impractical to do so because of the time required. In the interest of minimizing the curing time, it is preferred to cure the fibers at the highest temperature at which adherence and/or deformation of the fibers does not occur. In general, the lower the molecular weight of the novolac, the lower the temperature at which these occur. Therefore, it is usually preferred not to use extremely low molecular weight novolacs, thereby avoiding the need for very low curing temperatures and the attendant slow curing rates.

It is usually desirable to carry out the curing cycle at gradually increasing temperatures. Initially, a temperature is employed at which adherence and/or deformation does not occur. At this stage, the outer portion of the fiber begins to cure, forming a shell. Thereupon, the temperature may be raised as necessary to complete the cure, the shell eliminating any problems due to fusion which might otherwise occur. Such curing cycles are illustrated in Examples 2, 4, 5 and 6.

The curing time must be sufficiently long to render the uncured novolac fiber infusible. Once such infusibility has been achieved, further curing is unnecessary for purposes of the invention. However, it has often been found that further curing tends to enhance certain properties of the fibers, particularly elongation and fracture energy, and to a lesser degree the tensile strength. Such improvements may be seen from Examples 2 and 3, and also from Example 4. The further curing may be carried out by continued heating in the original curing environment, as in Example 5. Alternatively, the infusible fibers may be removed from the original environment and further cured by heating in a nonoxidizing atmosphere which serves to minimize side reactions. Preferably, an inert atmosphere such as nitrogen or a vacuum is employed. This method is illustrated in Examples 3, 4 and 6.

The infusible, cured novolac fibers of the invention possess a number of highly desirable properties, these properties being substantially the same regardless of the type of novolac employed or the molecular weight thereof. They are remarkably resistant to heat and flame, being infusible and non-flammable. They are also substantially unaffected by many acids and are insoluble in organic solvents.

The mechanical properties of the cured novolac fibers vary with the fiber diameter, and the tensile strength and break elongation both increase markedly with decreasing diameter. Considering a cured phenol formaldehyde novolac fiber with a diameter of 14–15 microns, typical properties would be: tensile strength, 15,000–35,000 p.s.i. (1,050–2,450 kg./sq. cm.); elastic modulus, 0.5–1.2 × $10^6$ p.s.i. (0.035–0.084 × $10^6$ kg./sq. cm.); break elongation; 3–20%; fracture energy, 0.02–0.30 inch gm./$100\mu^2$ (0.05–0.76 cm. gm./$100\mu^2$). Properties as high as the following have been observed for such a fiber: tensile strength, 60,000 p.s.i. (4,200 kg./sq. cm.); elastic modulus, 1.5 × $10^6$ p.s.i. (0.1 × $10^6$ kg./sq. cm.); break elongation, 44%; fracture energy, 0.46 inch gm./$100\mu^2$ (1.17 cm. gm./$100\mu^2$.

Various conventional textile techniques may be employed to process the cured novolac fibers into a variety of useful forms. The fibers, when prepared by drawing, are initially in continuous form, and may be cured in such form or cut from the spool and cured in the form of a staple fiber. Staple fiber may also be produced by a conventional blowing method. In continuous form, the fibers are useful for a wide variety of purposes in the same manner as continuous fibers of other well-known materials. Considering the staple form, this may be chopped into short lengths and made into paper by conventional means. Alternatively, the staple fiber may be carded to produce a fluffy web, which may be processed by needling to obtain needled felt or which may be with a resin binder to make resin bonded felt. The fluffy web may instead be divided into strips which are slightly twisted to form roving from which yarn may be formed which in turn may be woven into cloth.

The infusible, cured novolac fibers, in these various forms, may be employed for a wide range of purposes. By virtue of their resistance to heat and chemicals, paper and cloth made from such fibers are well suited to use as filters, for example in the filtration of hot gases as in air pollution control, and in the filtration of concentrated sulfuric or phosphoric acid, even at temperatures of 250° C. or higher. Cloth made from such fibers is well suited to use in making flame protective clothing, and is useful as a backing for coated abrasive products by virtue of its resistance to heat. The fibers, in suitable forms, may be used as thermal insulation and for the production of ablation materials.

Except as otherwise specified, percentages herein refer to percentages by weight.

Molecular weights of novolacs refer to number-average molecular weights. Molecular weight determinations were carried out by vapor phase osmometry.

Viscosities have been stated herein in centipoises. However, in all cases the viscosities were originally determined as apparent viscosities in lb. sec./in.$^2$ with a Model Gl D&R Melt Indexer, and converted to centipoises by multiplying by a factor of 6.88 × $10^6$ as reported in the literature.

We claim:
1. An infusible cured novolac fiber.
2. A novolac fiber according to claim 1 wherein said novolac is a phenol formaldehyde novolac.
3. A novolac fiber according to claim 1 having a diameter within the range of from about 0.1 micron to about 300 microns.
4. An infusible cured novolac fiber comprising the reaction product of a novolac and an aldehyde.
5. A fibrous product comprising infusible cured novolac fibers.
6. A fibrous product according to claim 5 wherein the same is a yarn.
7. A fibrous product according to claim 5 wherein the same is a fabric.
8. A fibrous product according to claim 7 wherein said fabric is woven.
9. A novolac fiber according to claim 26 having a maximum diameter of 25 microns.
10. A novolac fiber according to claim 24 having a tensile strength of at least 15,000 p.s.i. and a break elongation of at least 3%.
11. A novolac fiber according to claim 33 having an elastic modulus of at least 0.5 × $10^6$ p.s.i.
12. A fibrous product according to claim 28 consisting of infusible cured novolac fibers.

* * * * *